United States Patent [19]
Jensen et al.

[11] Patent Number: 5,588,869
[45] Date of Patent: Dec. 31, 1996

[54] TELECOMMUNICATIONS TERMINAL BLOCK

[75] Inventors: Michael L. Jensen, Cary; George D. Summers, Jr., Raleigh; Thomas M. Baum, Apex, all of N.C.

[73] Assignee: Raychem Corporation, Menlo Park, Calif.

[21] Appl. No.: 431,936

[22] Filed: May 1, 1995

Related U.S. Application Data

[63] Continuation of Ser. No. 46,339, Apr. 12, 1993, Pat. No. 5,423,694.

[51] Int. Cl.⁶ ........................................................ H01R 4/24
[52] U.S. Cl. ............................ 439/417; 439/418; 439/218
[58] Field of Search ...................................... 439/395–404, 439/410, 411, 409, 417–419, 402–404, 478, 482

[56] References Cited

U.S. PATENT DOCUMENTS

| | | |
|---|---|---|
| Re. 32,898 | 4/1989 | Dechelette . |
| 1,457,249 | 5/1923 | Janson et al. . |
| 1,901,893 | 3/1933 | Brodie . |
| 3,020,260 | 2/1962 | Nelson . |
| 3,254,181 | 5/1966 | Lemieux . |
| 3,281,625 | 10/1966 | Wanaselja . |
| 3,340,431 | 9/1967 | Wanaselja . |
| 3,380,013 | 4/1968 | Krone et al. . |
| 3,522,570 | 8/1970 | Wanaselja . |
| 3,535,582 | 10/1970 | Kawiecki . |
| 3,535,779 | 10/1970 | Wanaselja . |
| 3,605,072 | 9/1971 | Driscoll . |
| 3,703,700 | 11/1972 | Hasselbohm . |
| 3,755,615 | 8/1973 | Paullus et al. . |
| 3,761,868 | 9/1973 | Krone et al. . |
| 3,791,711 | 2/1974 | Jonassen . |
| 3,813,577 | 5/1974 | Kawiecke . |
| 3,828,290 | 8/1974 | Kawiecki . |
| 3,896,343 | 7/1975 | Baker et al. . |
| 3,990,762 | 11/1976 | Lemesle . |
| 4,034,326 | 7/1977 | Hill et al. . |
| 4,037,905 | 7/1977 | Lucas . |
| 4,056,840 | 11/1977 | Lundsgaard et al. . |
| 4,062,054 | 12/1977 | Simokat . |
| 4,068,277 | 1/1978 | Simokat . |
| 4,145,103 | 3/1979 | Knowles . |
| 4,150,414 | 4/1979 | Pagliuca . |
| 4,157,208 | 6/1979 | Roberts et al. . |
| 4,158,869 | 6/1979 | Gilberts . |
| 4,159,159 | 6/1979 | Kaucic et al. . |
| 4,212,047 | 7/1980 | Napiorkowski . |
| 4,212,507 | 7/1980 | Bunnell . |
| 4,275,432 | 6/1981 | Napiorkowski . |
| 4,303,959 | 12/1981 | Roberts et al. . |
| 4,319,300 | 3/1982 | Napiorkowski et al. . |
| 4,320,435 | 3/1982 | Jones . |
| 4,321,649 | 3/1982 | Gilberts . |
| 4,394,704 | 7/1983 | Jones . |
| 4,396,970 | 8/1983 | Scudner, Jr. . |
| 4,424,546 | 1/1984 | Smith . |
| 4,488,008 | 12/1984 | Dellinger et al. . |
| 4,500,158 | 2/1985 | Dola . |
| 4,541,679 | 9/1985 | Fiedler et al. . |

(List continued on next page.)

*Primary Examiner*—David L. Pirlot
*Attorney, Agent, or Firm*—William D. Zahrt, II; Herbert G. Burkard

[57] ABSTRACT

A terminal block for interconnecting conductors in telecommunications circuits is disclosed. The terminal block allows a plurality of telecommunication wires to be progressively connected to a connector member. The terminal block includes a conductor transporting driver module having passageways that customer wires and service wires are inserted into and a connector chamber housing two insulation displacing connector members for the tip and ring lines. Wires are connected to the connector member progressively through a cyclical motion of the driver module relative to the connector members along a path of travel having an angle relative to a mounting surface which facilitates easy access to both wires and a threaded fastener actuating the driver module even in the most demanding telecommunications housing environments.

17 Claims, 5 Drawing Sheets

U.S. PATENT DOCUMENTS

| | | |
|---|---|---|
| 4,548,459 | 10/1985 | Mosser, III . |
| 4,588,238 | 5/1986 | Mickelson et al. . |
| 4,597,623 | 7/1986 | Krumreich . |
| 4,600,261 | 7/1986 | Debbaut . |
| 4,600,804 | 7/1986 | Howard . |
| 4,614,396 | 9/1986 | Saligny ................................... 439/395 |
| 4,634,207 | 1/1987 | Debbaut . |
| 4,645,285 | 2/1987 | Cozzens et al. . |
| 4,647,121 | 3/1987 | Dolanskey et al. . |
| 4,662,692 | 5/1987 | Uken et al. . |
| 4,726,991 | 2/1988 | Hyatt et al. . |
| 4,729,059 | 3/1988 | Wang . |
| 4,729,064 | 3/1988 | Singer, Jr. . |
| 4,741,032 | 4/1988 | Hampton . |
| 4,741,480 | 5/1988 | Despault et al. . |
| 4,800,588 | 1/1989 | Poster, Jr. . |
| 4,822,306 | 4/1989 | Klaiber . |
| 4,846,721 | 7/1989 | DeBruycker et al. . |
| 4,851,946 | 7/1989 | Igarashi et al. . |
| 4,866,561 | 9/1989 | Dorival . |
| 4,910,489 | 3/1990 | Neuwiria et al. . |
| 4,910,770 | 3/1990 | Collins et al. . |
| 4,912,592 | 3/1990 | Flindall et al. . |
| 4,919,544 | 4/1990 | Graham . |
| 4,932,051 | 6/1990 | Karan et al. . |
| 4,945,559 | 7/1990 | Collins et al. . |
| 4,949,376 | 8/1990 | Nieves et al. . |
| 4,977,357 | 12/1990 | Shrier . |
| 4,979,209 | 12/1990 | Collins et al. . |
| 4,984,125 | 1/1991 | Uwano . |
| 4,988,311 | 1/1991 | Tanzola ................................... 439/404 |
| 4,992,333 | 2/1991 | Hyatt . |
| 5,021,004 | 6/1991 | Heiney . |
| 5,027,100 | 6/1991 | Neuwirth et al. . |
| 5,029,302 | 7/1991 | Masghati et al. . |
| 5,050,033 | 9/1991 | Pagliuca . |
| 5,068,634 | 11/1991 | Shrier . |
| 5,069,637 | 12/1991 | Baubles . |
| 5,074,804 | 11/1991 | Pantland et al. . |
| 5,085,597 | 2/1992 | Story et al. . |
| 5,086,368 | 2/1992 | Gerke et al. . |
| 5,090,917 | 2/1992 | Noorily et al. . |
| 5,139,440 | 8/1992 | Volk et al. . |
| 5,149,278 | 8/1992 | Waas et al. . |

5,588,869

TELECOMMUNICATIONS TERMINAL BLOCK

This application is a continuation of application Ser. No. 08/046,339, filed Apr. 12, 1993, now U.S. Pat. No. 5,423, 694.

FIELD OF THE INVENTION

This invention relates to terminal blocks for interconnecting conductors in telecommunications circuits, particularly, first telecommunication wires, e.g., "customer" wires, and second wires, e.g., telephone company service (drop) wires. The invention more specifically relates to a terminal block by which a plurality of telecommunication wires may be progressively connected to a connector member without interruption of the connection of wires already connected to the connector member.

BACKGROUND OF THE INVENTION

It is known to provide terminal blocks with connector members each having a slot for receiving and establishing electrical contact with a conductor such as a service wire, and also each having one or more additional slots each adapted to receive and establish electrical contact with respective ones of a plurality of other conductors, such as telecommunication customer wires, which need to be electrically connected to the service wire. The conductors customarily are and must be inserted simultaneously, as a group, into respective associated ones of the slots. Proper insertion of the conductors into the slots by a telecommunications craftsperson may be quite difficult, particularly when a large number of conductors are involved and/or when the insertion must be accomplished in adverse weather or lighting conditions. Furthermore, if the telephone company service or drop wire is electrically connected to the connector member while the craftsperson is working with the customer wires, the craftsperson may be exposed to shock from lightning or other stray voltages carried on the service wire.

SUMMARY OF THE INVENTION

The terminal block of the present invention, in contrast to the prior art terminal blocks discussed above, permits but does not require simultaneous termination of all of the conductors to the connector member, and instead permits progressive termination of any desired one or ones of the conductors to the connector member, and does so without disconnecting any already terminated ones of the conductors from the connector member. This reduces the number of conductors which the telephone craftsperson must simultaneously handle, which in turn simplifies the conductor terminating process and reduces the possibility of malfunctions due to incorrect conductor positioning, etc.

DESCRIPTION OF THE DRAWINGS

Other features of the invention will be apparent from the following description of an illustrative embodiment thereof, and from the accompanying drawings, in which:

FIG. 3A is an enlarged rear elevational view, taken in the direction of the arrows 3a of FIG. 3, of wire guiding and driving components carried by and extending rearwardly from the front wall of a driver module of the terminal block:

DESCRIPTION OF THE PREFERRED EMBODIMENT

As will be illustrated by reference to the Figures, the present invention is a terminal block allowing progressive interconnection of a plurality of conductors. More particularly, in one embodiment, one or more first or customer wires may be connected to each of a pair of second or service wires.

Figure 1:
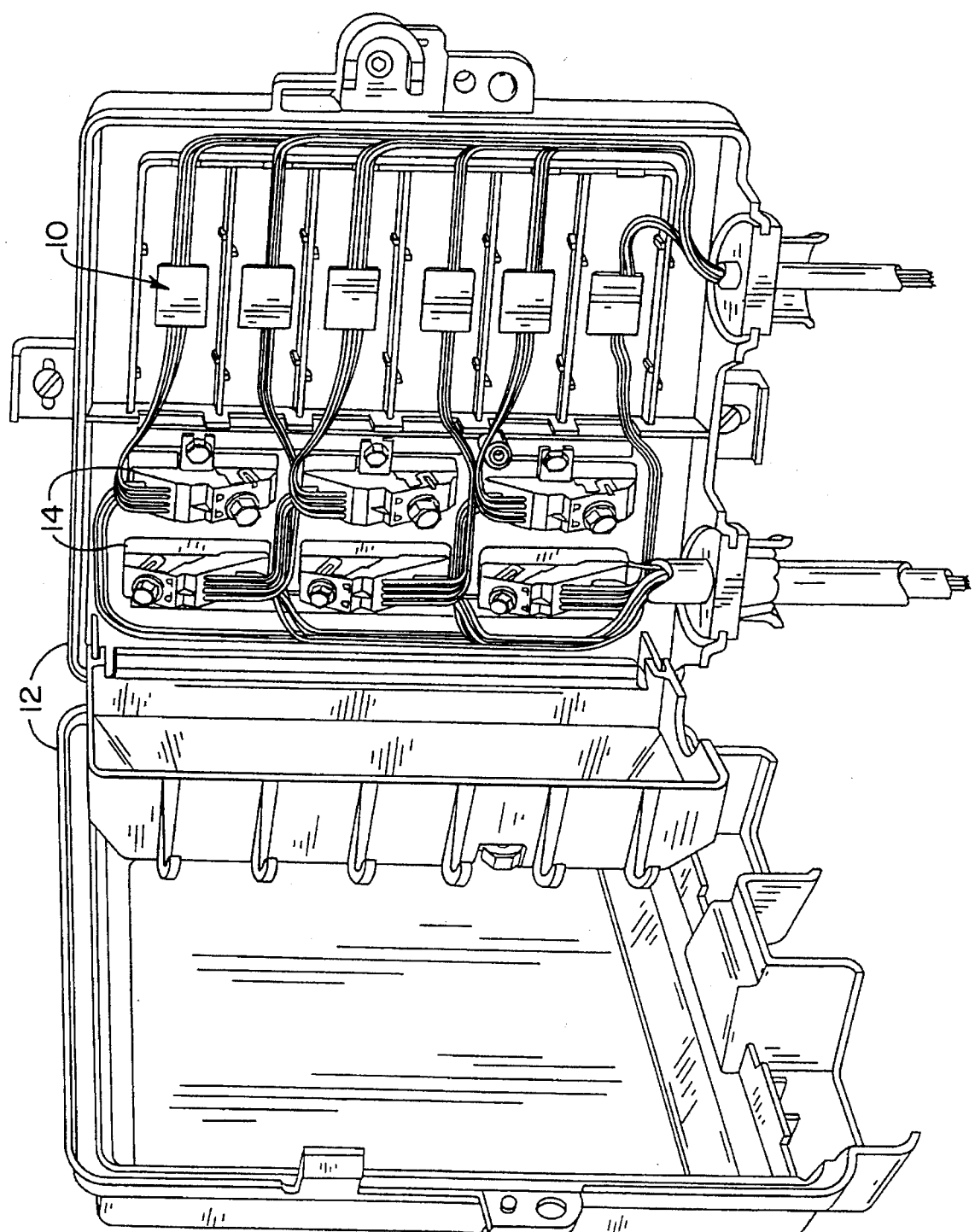
FIG. 1 is a plan view of the interior of a known housing containing a plurality of network interface devices (NID) each having a terminal block in accordance with the invention.

FIG. 1 of the drawings schematically shows a plurality of low profile network interface devices 10 mounted in a housing 12 of conventional construction. Network interface devices 10 may include any of a variety of electrical modules know for use in this type of housing application such as an RJ-11 test plug and socket. Each device 10 is associated with and electrically connected to a terminal block 14 (FIGS. 2–5) for interconnecting two service wires 16 with a plurality (illustratively four) of subscriber wires 17. In normal telephone connection applications, the two service wires 16 associated with each terminal block 14 are what are commonly know as the tip and ring lines. It will be understood, however, that the present invention is not limited to use of the terminal blocks in NID applications only, and also is not limited to any particular number of wires. The present invention is also advantageous for use in cross-connect, bridging and site termination applications as well as in connecting the telephone company lines from the central office to service wires for respective customers such as is commonly done in a telephone company pedestal or at a telephone pole.

Figure 3:
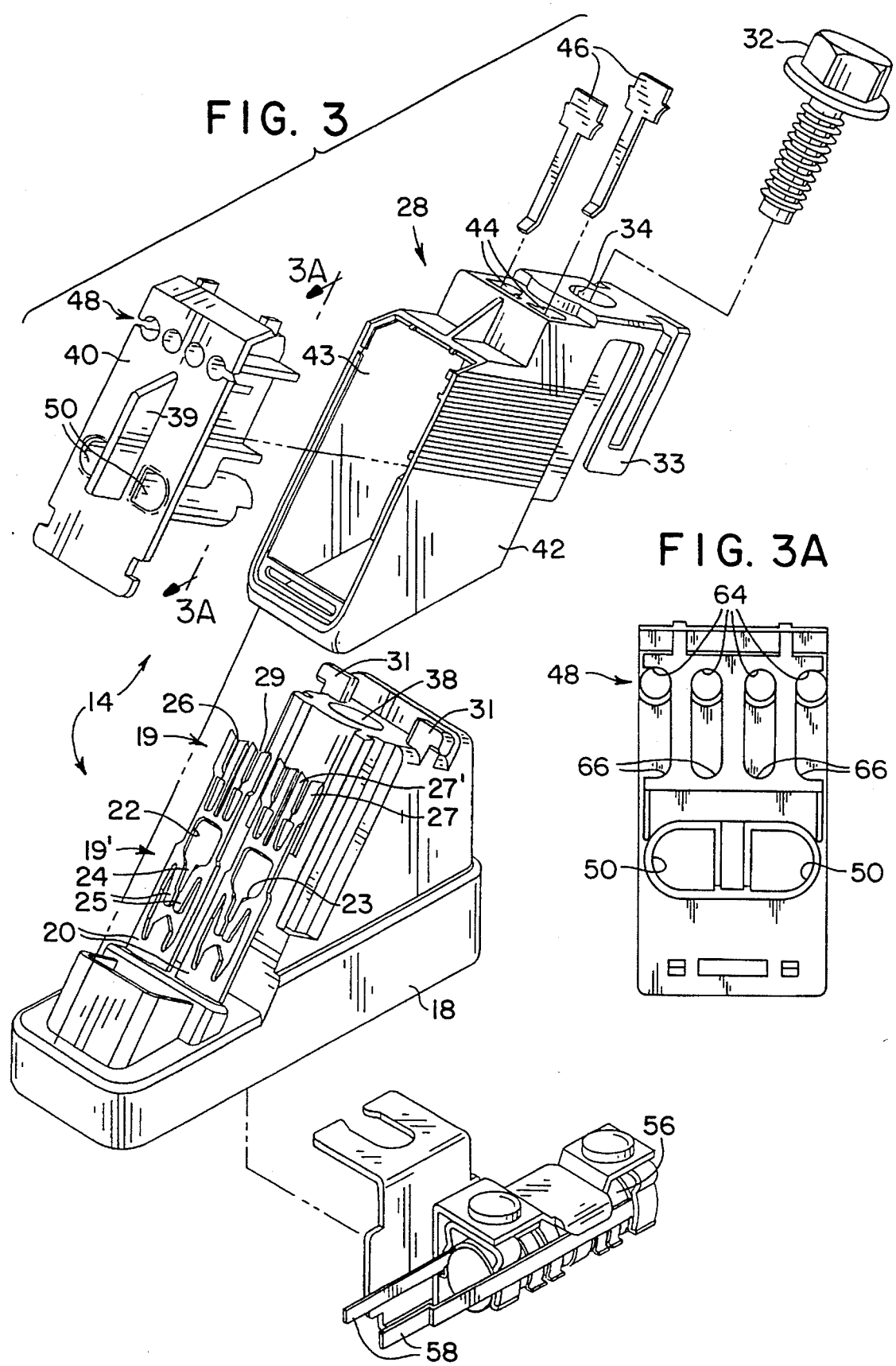
FIG. 3 is an exploded perspective view of components of the block of FIG. 2.

Each terminal block 14 includes a base 18 having a generally planar undersurface. A pair of elongate insulation displacing type conductive connector members 20 extend upwardly and rearwardly from the forward part of base 18, illustratively at an angle within the range of approximately 30°–70°, preferably 40°–55° and more preferably, as illustrated in FIG. 3 at 45° relative to the undersurface of base 18. Each connector member 20 includes a plurality of wire (conductor) receiving means 19, 19' for receiving and establishing electrical connection with respective ones of wires 16, 17. As best illustrated in FIGS. 3 and 6, wire receiving means 19' includes, at a location intermediate the length of connector member 20, a wire receiving opening 22 overlying and communicating with an underlying slot 24 which is defined by a pair of confronting elements 25, and has an open end 23. Slot 24 is adapted to receive, releasably grip, and establish electrical contact with one of the wires 16. Each connector member 20 also has a plurality (illustratively two) wire receiving means 19. Each first wire receiving means 19 includes an upwardly opening slot 26 which is defined by a pair of confronting elements 27, 27' and has an open end 29. Slot 26 is adapted to receive, releasably grip, and establish electrical contact with respective ones of the wires 17. When wires 16, 17 are insulated, as shown, at least one of the confronting edges of each slot 24, 26 is sufficiently sharp as to cut and penetrate through the insulation and contact the metallic core of the wire introduced into the slot. If wires 16, 17 are not insulated, the confronting edges of slots 24, 26 may be blunt, rather than sharp.

The illustrated embodiment of the present invention includes a wire (conductor) transporting means which is mounted upon and movable relative to base 18 for effecting progressive electrical connection of desired ones of conductors 16, 17 without disconnecting any customer wires 17 previously connected to connector member 20. Service wire 16 is handled differently to minimize the craftsperson's risk of injury from voltage spikes being carried by service wire 16. As will be described more fully below, service wire 16 is disconnected from member 20 during each cycle of the conductor transporting means. The conductor transporting means includes wire (conductor) driver module 28 and driver means associated with driver module 28 for establishing and disconnecting the electrical connection of conductors 16, 17 to connector member 20.

Wire (conductor), driver module 28 is mounted for sliding movement upon base 18 by mating tongue 30 and groove 32 elements, one pair of which is shown in FIG. 3, upon the module and base. Module 28 is slidably movable to and between an upper (third) position distal from base 18 illustrated in phantom lines in FIG. 4, a lower (second) position adjacent base 18 shown by solid lines in FIG. 5, and a wire (conductor) receiving (first) position intermediate the lower position and the upper position as shown by solid lines in FIG. 4. The module may also be moved to an extreme upper wire-disconnecting position shown by phantom lines in FIG. 5.

Figure 2:
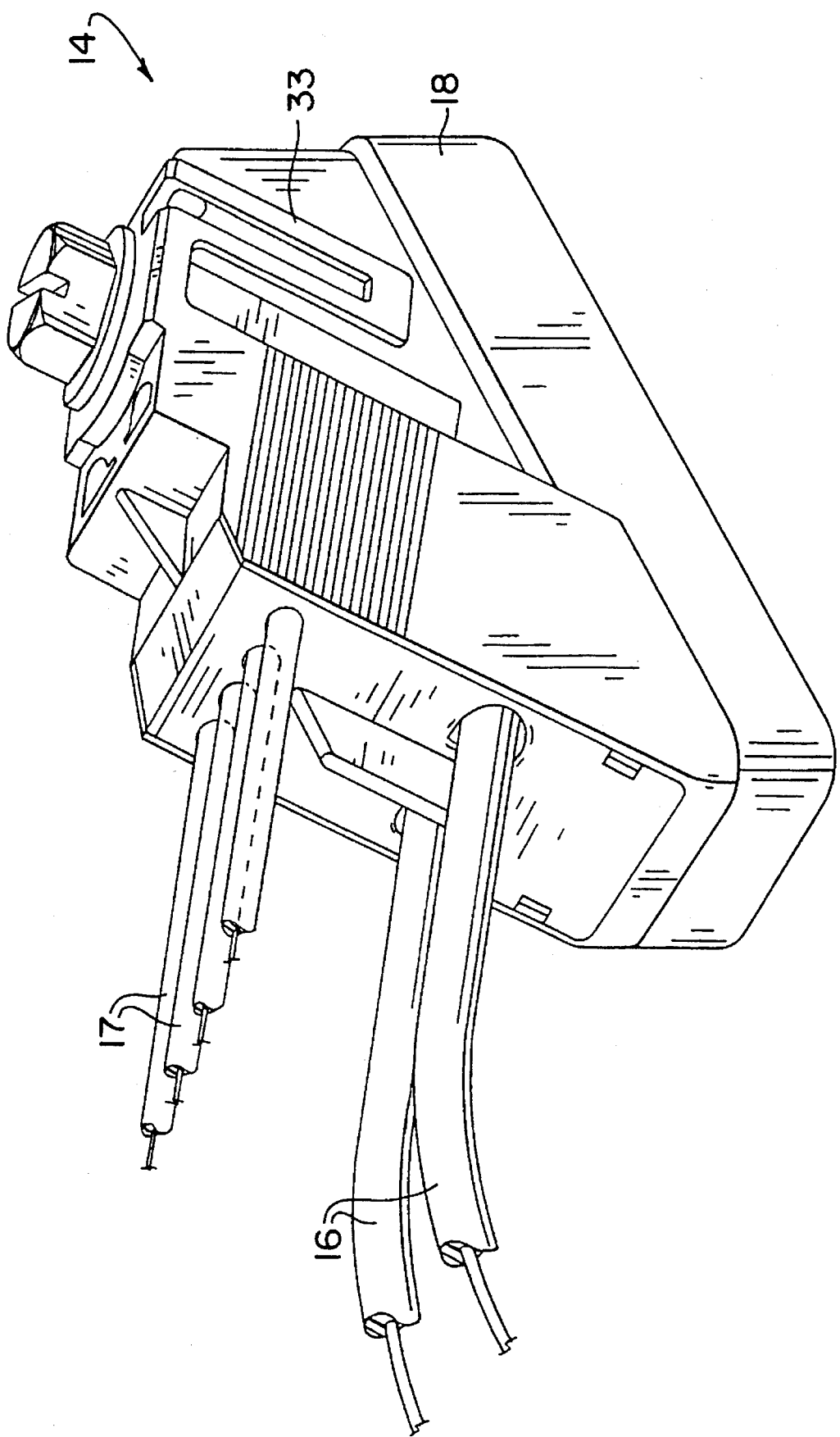
FIG. 2 is an enlarged perspective view of one of the terminal blocks of FIG. 1, and of service and customer wires terminated by components of the block.
Figure 4:
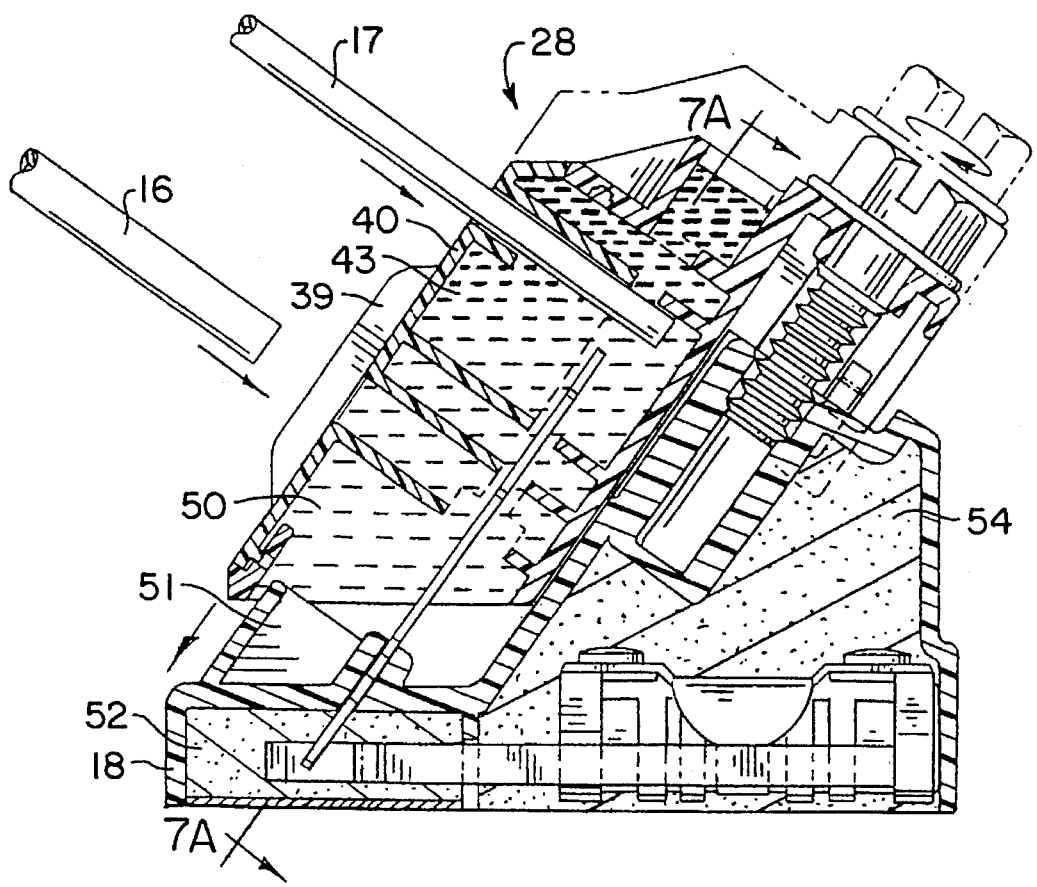
FIG. 4 is a view primarily in vertical section and partially in elevation through the terminal block of FIG. 2, showing the wire transporting driver module of the terminal block in a "wire receiving" position intermediate an upper position, shown by phantom lines, and a lower position.
Figure 5:
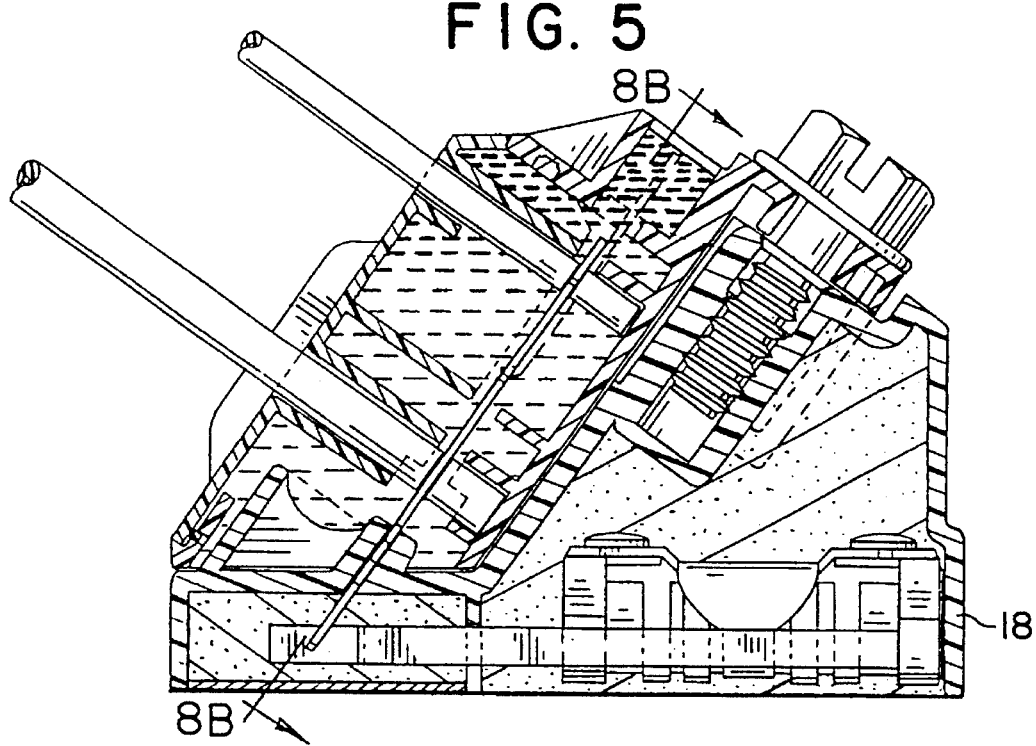
FIG. 5 is a view similar to FIG. 4 but showing the wire transporting driver module in its lower position.

Movement of module 28 between its aforesaid positions is achieved by the driver means. In one embodiment as best illustrated in FIGS. 4 and 5, the driver means includes a thread forming or other type of threaded fastener 32 that extends through an opening 34 of module 28 and into a complementary bore 38 opening from the upper surface of base 18. When fastener 32 is not in threaded engagement with bore 38, module 28 may also be moved manually by a craftsperson, and a handle 39 is provided upon the front wall 40 of the module to facilitate such movement. Inadvertent movement of module 28 beyond its upper position is prevented by slotted retainer members 33, one of which is shown in FIGS. 2 and 3, that are connected to module 28, overlie opposite sides of base 18, and have lower ends that abut retainer elements 31 upon base 18 when module 28 is moved to its upper position illustrated in phantom lines in FIG. 4. Upward movement of module 28 beyond its aforesaid upper position shown by phantom lines in FIG. 4 to fully disconnect module 28 from base 18 can be realized, when desired, by flexing the lower ends of retainer members 29 outwardly to an extent causing them to clear retainer elements 31 and manually removing module 28.

To assist the craftsperson in distinguishing between the upper and wire receiving positions during installation of wires a position signaling means associated with module 28 is desirable for notifying the craftsperson when module 28 is in the wire receiving position. In one embodiment, not illustrated, the signaling means provides an auditory signal, preferably a "click" when module 28 is moved to the wire receiving position. This may be accomplished by placing tabs across slotted retainer members 33 positioned to ride over retainer members 31 and allow members 33 to snap back into contact with base 18 after the tabs have passed over retainer members 31. A "click" noise is caused when member 33 strikes base 18. Another embodiment of a position signaling means is illustrated in FIG. 4. Threaded fastener 32 only remains in threaded engagement in bore 38 from the lower position through the wire receiving position of module 28. Therefore, when fastener 28 is rotated to its outermost position, module 28 is in the wire receiving position. Module 28 can then be moved by the craftsperson by hand between the wire receiving position and the upper position.

The connector members 20 upon base 18 extend angularly upwardly into the forwardly disposed main body 42 of driver module 28, and are spaced from and underlie respective ones of a pair of test ports 44 opening from the module connector chamber 43 which houses connector members 20. Contact extension elements 46, best shown in FIG. 3, have toothed upper ends that are secured within respective ones of test ports 44 and are adapted to be engaged by alligator clips, test probes or the like (not shown). Angular lower end portions of elements 46 slidably engage and maintain electrical contact with respective ones of the underlying connector members 20. Preferably, elements 46 engage members 20 throughout the range of travel of module 28 to thereby allow a test probe to be easily engaged by a craftsperson regardless of the position of module 28.

Figure 7A:
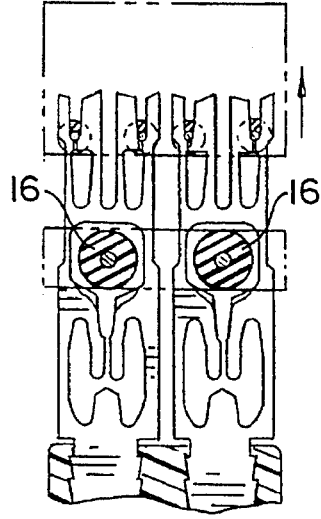
FIGS. 7a–7c are partially schematic sequential fragmentary views of slotted wire connector members as in FIGS. 6a–6f with additional phantom lines illustrating the action of the wire driver members for the second or service wires and further illustrates the motion of the service wires into wire receiving slots of the connector members.
Figure 7B:
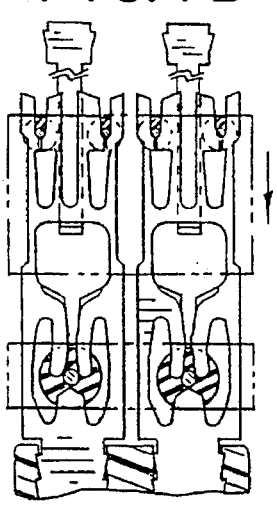

As illustrated in FIGS. 3 and 7b, the inner ones of confronting, elements 27, 27' are wider than the outer confronting elements. This provides a greater contact area on connector member 20 for extension elements 46 to slidably engage. This also moves wires 17 relatively toward the outer edges of connector member 20 when in slots 26, providing added clearance between extension elements 46 and wires 17.

In one embodiment, the driver means also includes a plurality (illustratively four) of coplanar wire (conductor) receiving passageways 48 that extend into and through the upper part of the front wall 40 of driver module 28, and a s plurality (illustratively two) of second coplanar service wire (conductor) passageways 50 extending into and through the lower part of such wall. When module 28 occupies its wire receiving position shown by solid lines in FIG. 4, passageways 48, or any desired one or ones of them, direct customer wires 17 introduced therein by a telecommunications craftsperson to a location overlying respective ones of the slots 26 within the upper ends of connector members 20. Passageways 50 similarly receive service wires 16 introduced therein by the craftsperson, and conduct such wires into the connector openings 22 that overlie the slots 24 in the lower part of connectors 20.

Connector chamber 43 of driver module 28 contains sealant material 50, which preferably is of a gel type, that surrounds and protects connector members 20 and wires 16, 17, and minimizes entry of dirt, moisture and the like into the chamber. As illustrated in FIG. 5, base 18 includes gas chamber 51 which communicates with connector chamber 43. When module 28 is in the lower position adjacent base 18, some of the sealant material 50 enters gas chamber 51 and compresses the air or other gas contained in chamber 51. The compressed air thereafter acts as a gas spring that maintains a compressive force upon the sealant material 50 within connector chamber 43 to eliminate, or at least reduce the size of, any voids that might be in the sealant.

A compartment 52 within the lower front part of base 18 receives the lower end sections of connector members 20. Another compartment 54 of base 18 contains a surge protector 56, and conductors 58 that extend from protector 56 into compartment 52 and into conductive engagement with conductor members 20. Both compartments 52, 54 are filled with sealant material 60, preferably a potting compound.

Referring now also to FIG. 3a of the drawings, in one embodiment, passageways 48 of module 28 are vertically elongated in the direction of the path of movement of module 28. Passageways 48 are bordered at their upper ends by a wall 64, or other upper conductor driver surface and at their opposing lower or bottom ends by a wall 66 or other lower conductor driver surface. Passageways 48 also have a wire receiving opening through front wall 40 of module 28 through which wires 17 enter passageways 48. When module 28 occupies its solid line position of FIG. 4, wires 17 then inserted into module 28 via passageways 48 overlie respective ones of the slots 26 in the upper part of connectors 20. When module 26 is moved downwardly from its solid line wire receiving position of FIG. 4 to its lower position of FIG. 5, wall 64 overlying passageway 48 engages wires 17 to move wires 17 downwardly into a respective slot 26. The vertical spacing between wall 64 and wall 66 is sufficiently great that return upward movement of module 28 to its solid line position of FIG. 4 does not cause removal of wires 17 from slots 26 by wall 66. However, when module 28 is further moved to its upper position illustrated by phantom lines in FIG. 4, wall 66 engages wires 17 to move wires 17 out of its respective slot 26.

Similarly, downward movement of module 28 from its solid line position of FIG. 4 to its position of FIG. 5 causes the upper wall of passageways 50 to drive any wire or wires 16 then within passageways 50 into underlying ones of the slots 24 of connectors 20. However, as contrasted with passageways 48, return upward movement of module 28 to its solid line wire receiving position of FIG. 4 disconnects the electrical connection of wires 16 to connector members 20 by removing wires 16 from slots 24.

Consequently, in the upper position of module 28, the driver means disconnects the electrical connection of all of wires 16, 17 while in the wire receiving position of module 28 the driver means disconnects the electrical connection of service wires 16 to connector members 20 but any customer wires 17 which have already been electrically connected with connector members 20 remain electrically connected. In the lower position of module 28 the driver means electrically connects all wires 16, and 17 to connector members 20.

Terminal block 14 may be used to terminate wires 16 and/or 17 simultaneously, as is conventional. As previously noted, however, under certain conditions progressive (sequential) termination of the wires may be preferable. Terminal block 14 provides this capability.

Figure 6A:
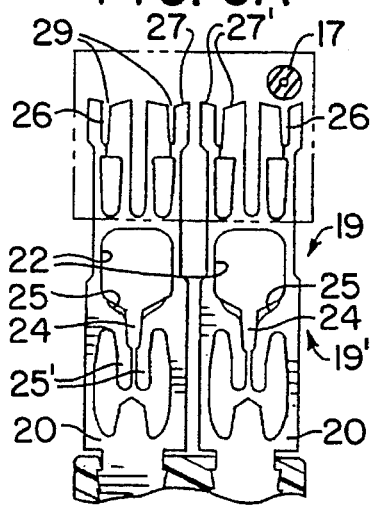
FIGS. 6a–6f are partially schematic sequential fragmentary views of slotted wire connector members and, in phantom lines, wire driver members for a plurality of first or customer wires, and further illustrates progressive introduction of customer wires into wire receiving slots of the connector members.
Figure 6B:
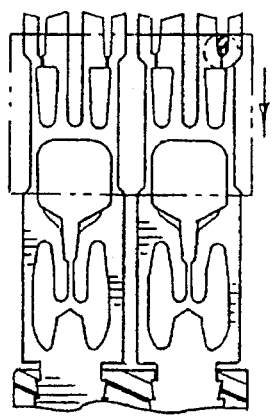
Figure 6C:
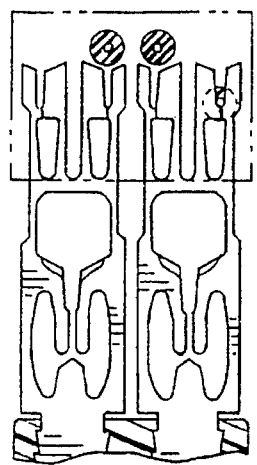
Figure 6D:
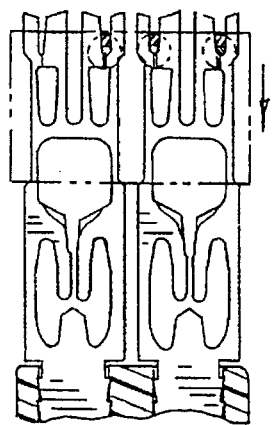
Figure 6E:
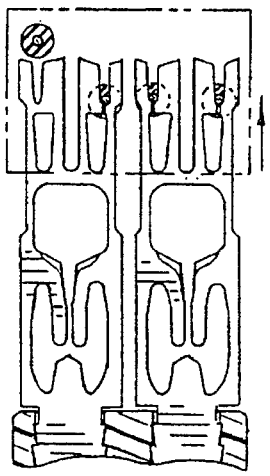
Figure 6F:
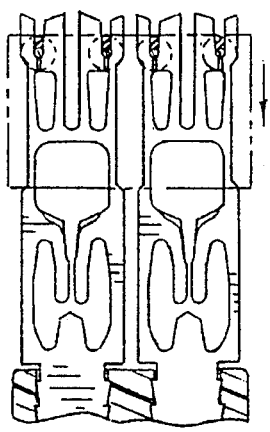
Figure 7C:
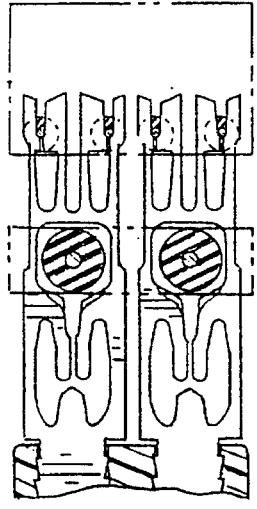

A method of implementing progressive termination of wires 16, 17 is shown in FIGS. 6a–7c of the drawings, in which the upper and lower edges of the large rectangular box shown in phantom lines respectively represent the upper and lower walls 64, 66 bordering passageways 48, and the upper and lower edges of the small rectangular box show in FIGS. 7a–7c respectively represent the upper and lower extremities of the service wire passageways 50 of module 28.

Assuming that module 28 occupies its wire receiving position shown by solid lines in FIG. 4 at the outset of a wire terminating operation and that no wires have yet been inserted, a wire 17 then inserted into the module via one of the wire passageways 48 extends to a location above one of the slots 26 of connectors 20, as shown in FIG. 4 and in FIG. 6a. Downward movement of module 28, in response to rotation of fastener 32 by a craftsperson, then drives wire 17 into the underlying connector slot 26, as shown in FIG. 5 and FIG. 6b. FIG. 6c shows upward movement of module 28 back to its FIG. 4 wire receiving position, which movement can be quickly effected manually by a craftsperson when fastener 32 is rotated until it is no longer in threaded engagement with bore 38. This permits positioning of one or more (illustratively two) additional wires 17 above underlying other ones of slots 26, as shown in FIG. 6c. Downward movement of module 28 then drives the additional wires into additional underlying ones of the slots. The foregoing sequence is repeated, as shown in FIGS. 6d–6f, until termination of all, or any lesser desired number, of the wires 17 has been effected.

Referring now to FIGS. 7a–7c, wherein the upper and lower edges of the small phantom line box represent the respective upper and lower edges of the passageways 50 of module 28, movement of module 28 back to its wire receiving position of FIG. 4 permits insertion of one or both (illustratively the latter) service wires 16 into passageways 50 and into the openings 22 of connectors 20 without disconnecting any of wires 17, as shown in FIG. 7a. Downward movement of module 28 then drives wires 16 into underlying slots 24, as shown in FIG. 7b completing the termination process.

Wires 16 and 17 may, if desired, be moved upwardly from respective slots 24 and 26. As illustrated in FIG. 7c, wires 16 are removed when module 28 is moved to the wire receiving position by rotation of fastener 32. Module 28 must then be manually moved by the craftsperson to the upper position illustrated in phantom lines in FIG. 4 to remove wires 17 from slots 26. Module 28 is then manually moved back toward base 18 until fastener 32 is again in threaded engagement with bore 38.

Prior to commencing wire termination, module 28 may occupy its lower position of FIG. 5, wherein the lower end of module 28 abuts the lower front part of base 18 and fastener 32 extends to a maximum extent into base 34. When module 28 occupies said position any wires 16, 17 inserted into passageways 48, 50 would abut solid portions of connectors 20, rather than being positioned above the wire receiving slots of the connectors. Before beginning wire installation, module 28 is therefore moved to its wire receiving position shown by solid lines in FIG. 4, by rotation in the appropriate direction of fastener 32.

A craftsperson may detect the arrival of module 28 at its wire receiving position visually and/or by cessation, or reduction of the force required to rotate fasteners 32 or alternatively by another position signaling means as described herein.

While service wires 16 might be terminated before or simultaneously with one or more subscriber wires 17, termination of wires 16 last is preferable from the safety viewpoint. Likewise, when disconnecting wires disconnection of service wires 16 first is preferable from the safety viewpoint.

While a specific embodiment of the invention has been shown and described, this was for purposes of illustration only, and not for purposes of limitation, the scope of the invention being in accordance with the following claims.

We claim:

1. A telecommunications terminal block for interconnecting first wires and a second wire, comprising:
   a base;
   a connector member carried by said base, said connector member having one or more first wire receiving means for receiving and establishing electrical connection with respective ones of said first wires, and also having a second wire receiving means for receiving and establishing electrical connection with said second wire;
   wire termination means mounted upon and movable at an angle within the range of approximately 300°–75° relative to a bottom plane of said base for effecting progressive electrical connection of desired ones of said first wires to said connector member without disconnecting the electrical connection of any other of said first wires which were previously connected to said connector member by said wire termination means and disconnecting the electrical connection of said second wire to said connector member; and
   drive means for imparting such movement to said wire termination means, said drive means being accessible from a direction oblique to the direction from which said wires access said wire receiving means.

2. A terminal block as in claim 1, wherein said first wires are customer wires, and said second wire is a service wire.

3. A terminal block as in claim 1, wherein said first wires and said second wire are insulated and said connector member is an insulation displacing connector.

4. A terminal block as in claim 1, wherein said drive means includes a threaded fastener.

5. A terminal block as in claim 1, and further including a surge protector within said base.

6. A telecommunications terminal block for interconnecting first wires and a second wire, comprising:
   a base:
   a connector member carried by and extending upwardly from said base, said connector member having one or more first wire receiving means for receiving and establishing electrical connection with respective ones of said first wires, and also having a second wire receiving means for receiving and establishing electrical connection with said second wire;
   wire termination means mounted upon and movable relative to said base for effecting progressive electrical connection of desired ones of said first wires to said connector member without disconnecting the electrical connection of any other of said first wires which were previously connected to said connector member by said wire termination means, and disconnecting the electrical connection of said second wire to said connector member, said wire transporting means including a connector chamber housing said connector member and said connector chamber having an open test port adjacent an upper end thereof; and
   a conductive extension element electrically connected to said connector member and extending therefrom to a location adjacent said test port.

7. A terminal block as in claim 6, wherein said conductive extension element is connected to said test port.

8. A terminal block as in claim 6, wherein said first wires are customer wires, and said second wire is a service wire.

9. A terminal block as in claim 6, wherein said first wires and said second wire are insulated and said connector member is an insulation displacing connector.

10. A telecommunications terminal block for interconnecting first wires and a second wire, comprising:
    a base;
    a connector member carried by and extending upwardly from said base, said connector member having one or more first wire receiving means for receiving and establishing electrical connection with respective ones of said first wires, and also having a second wire receiving means for receiving and establishing electrical connection with said second wire;
    a wire transporting driver module mounted upon said base for movement between a lower position adjacent said base, an upper position distal from said base, and a wire receiving position intermediate said lower position and said upper position;
    said driver module having driver means for electrically connecting and disconnecting said first wires and said second wire to said connector member; and
    wherein in said upper position of said driver module said driver means disconnects the electrical connection of all of said first wires and said second wire to said connector member, in said wire receiving position said driver means disconnects the electrical connection of said second wire to said connector member and any of said first wires having an electrical connection which was previously established with said connector member by said driver module remain in electrical connection with said connector member, and in said lower position of said driver module said driver means electrically connects each of said first wires and said second wire to said connector member.

11. A terminal block as in claim 10, further including position signaling means associated with said wire transporting driver module for notifying a craftsperson when said wire transporting driver module is in said wire receiving position.

12. A terminal block as in claim 10, wherein said driver means includes a threaded fastener.

13. A terminal block as in claim 12, wherein said threaded fastener only moves said wire transporting driver module between said lower position and said wire receiving position.

14. A terminal block as in claim 13, wherein said wire transporting driver module may be manually moved between said wire receiving position and said upper position.

15. A telecommunications terminal block for interconnecting first wires and a second wire, comprising:
    a base;
    a connector member carried by and extending upwardly from said base, said connector member having one or more first wire receiving means for receiving and establishing electrical connection with respective ones of said first wires, and also having a second wire receiving means for receiving and establishing electrical connection with said second wire;

wire termination means mounted upon and movable relative to said base between first and second positions for effecting progressive electrical connection of additional ones of said first wires to said connector member without disconnecting the electrical connection of any other of said first wires which were previously connected to said connector member by said wire termination means, and in said second position disconnecting the electrical connection of said second wire to said connector member; and said wire termination means being movable to a third position which disconnects the electrical connection of all of said first wires and said second wire from said connector member.

16. A terminal block as in claim 15, wherein said first wires are customer wires, and said second wire is a service wire.

17. A terminal block as in claim 15, wherein said first wires and said second wire are insulated and said connector member is an insulation displacing connector.

* * * * *